United States Patent
Koyama

(10) Patent No.: US 10,392,478 B2
(45) Date of Patent: Aug. 27, 2019

(54) METHOD FOR PRODUCING WET RUBBER MASTERBATCH

(71) Applicant: TOYO TIRE & RUBBER CO., LTD., Itami-Shi, Hyogo (JP)

(72) Inventor: Shuhei Koyama, Itami (JP)

(73) Assignee: TOYO TIRE CORPORATION, Itami-shi (JP)

( * ) Notice: Subject to any disclaimer, the term of this patent is extended or adjusted under 35 U.S.C. 154(b) by 14 days.

(21) Appl. No.: 15/661,792

(22) Filed: Jul. 27, 2017

(65) Prior Publication Data

US 2018/0105651 A1    Apr. 19, 2018

(30) Foreign Application Priority Data

Oct. 14, 2016  (JP) ................. 2016-202848

(51) Int. Cl.
*C08J 3/22* (2006.01)
*C08J 3/215* (2006.01)

(52) U.S. Cl.
CPC ........... *C08J 3/22* (2013.01); *C08J 3/215* (2013.01); *C08J 2307/02* (2013.01)

(58) Field of Classification Search
CPC ............... C08J 2307/02; C08J 3/22
USPC ................................ 523/334, 351
See application file for complete search history.

(56) References Cited

U.S. PATENT DOCUMENTS

2015/0133592 A1* 5/2015 Miyasaka ............ B60C 1/00
                                                            524/495
2017/0044347 A1    2/2017 Yanagi

FOREIGN PATENT DOCUMENTS

| JP | 2015-214626 A | 12/2015 |
| JP | 2016-37547 A | 3/2016 |
| JP | 2016-519196 A | 6/2016 |
| WO | 2014/189826 A1 | 11/2014 |

* cited by examiner

*Primary Examiner* — Edward J Cain
(74) *Attorney, Agent, or Firm* — Westerman, Hattori, Daniels & Adrian, LLP

(57) ABSTRACT

A method for producing a wet rubber comprises a step (I) of dispersing the filler into the dispersing solvent, and adding, at the time of the dispersing, at least one portion of the rubber latex solution to the dispersing solvent to produce a slurry solution containing the filler to which particles of the rubber latex adhere, a step (II) of mixing the slurry solution containing the filler, to which the rubber latex particles adhere, with the rest of the rubber latex solution to produce a rubber latex solution containing the filler, to which the rubber latex particles adhere, and a step (III) of solidifying and drying the rubber latex solution containing the filler. About the filler, the ratio of the nitrogen adsorption specific surface area ($N_2SA$) thereof to the iodine adsorption amount (IA) thereof (($N_2SA$)/(IA)) is 1.00 or more.

3 Claims, No Drawings

METHOD FOR PRODUCING WET RUBBER MASTERBATCH

BACKGROUND OF THE INVENTION

Field of the Invention

The present invention relates to a method for producing a wet rubber masterbatch yielded using at least a filler, a dispersing solvent and a rubber latex solution as raw materials.

Description of the Related Art

In the rubber industry, it has been hitherto known that at the time of producing a rubber composition containing a filler such as a carbon black, a wet rubber masterbatch is used to improve the composition in workability and filler-dispersing performance. This masterbatch-used process is a process of mixing a filler and a dispersing solvent beforehand with each other at a predetermined ratio, and dispersing the filler into the dispersing solvent by mechanical force to prepare a filler-containing slurry solution; mixing the slurry solution with a rubber latex solution in a liquid phase; adding thereto a solidifier such as an acid to yield a solidified product; and then collecting and drying the solidified product. The use of the wet rubber masterbatch can give a rubber composition better in filler-dispersing performance and rubber properties such as workability and reinforceability than the use of a dry rubber masterbatch yielded by mixing a filler with a rubber in a solid phase. The use of such a rubber composition as a raw material makes it possible to produce, for example, a pneumatic tire decreased in rolling resistance and excellent in fatigue resistance, or such a rubber product.

The filler to be used is appropriately selected in a scope from large-particle-diameter fillers to small-particle-diameter fillers in accordance with the usage of the rubber product. In the case of using, for example, a small-particle-diameter carbon black species, the resultant vulcanized rubber is improved in, e.g., strength and abrasion resistance. However, particles of the small-particle-diameter carbon black species easily aggregate in the rubber composition, which is a raw material of the resultant vulcanized rubber, so that this rubber tends to be deteriorated in fatigue resistance.

Patent Documents 1 to 3 listed below each describe a wet rubber masterbatch into which a small-particle-diameter carbon black species is blended. However, it has been made evident that these masterbatches have a room for a further improvement from the viewpoint of an improvement of the resultant vulcanized rubbers in fatigue resistance.

PRIOR ART DOCUMENTS

Patent Documents

Patent Document 1: JP-A-2016-519196
Patent Document 2: JP-A-2016-37547
Patent Document 3: JP-A-2015-214626

SUMMARY OF THE INVENTION

In the light of the above-mentioned actual situation, the present invention has been made. An object thereof is to provide a method for producing a wet rubber masterbatch that makes it possible to improve the resultant vulcanized rubber in fatigue resistance even when a small-particle-diameter carbon black species is blended into the masterbatch.

Accordingly, the present invention is a method for producing a wet rubber masterbatch yielded using at least a filler, a dispersing solvent and a rubber latex solution as raw materials, the method including: a step (I) of dispersing the filler into the dispersing solvent, and adding, at the time of the dispersing, at least one portion of the rubber latex solution to the dispersing solvent to produce a slurry solution containing the filler to which particles of the rubber latex adhere; a step (II) of mixing the slurry solution containing the filler, to which the rubber latex particles adhere, with the rest of the rubber latex solution to produce a rubber latex solution containing the filler, to which the rubber latex particles adhere; and a step (III) of solidifying and drying the produced rubber latex solution containing the filler, wherein about the filler, the ratio of the nitrogen adsorption specific surface area ($N_2SA$) thereof to the iodine adsorption amount (IA) thereof (($N_2SA$)/(IA)) is 1.00 or more.

In the method according to the present invention for producing a wet rubber masterbatch, the filler is dispersed into the dispersing solvent, and at the time of the dispersing, at least one portion of the rubber latex solution is added to the dispersing solvent to produce a slurry solution containing the filler to which particles of the rubber latex adhere (the step (I)). In this way, a very thin latex layer is produced on portions or the whole of surfaces of particles of the filler. Thus, when the slurry solution containing the filler is mixed with the rest of the rubber latex solution, the particles of the filler can be prevented from aggregating again. Furthermore, also in the step (III) of solidifying and drying the rubber latex solution containing the filler, to which the rubber latex particles adhere, the particles of the filler can be prevented from aggregating again. As a result, a wet rubber masterbatch can be yielded in which the filler is evenly dispersed, and over time the dispersion stability of the filler is also excellent.

Apart from the above, the ratio of the nitrogen adsorption specific surface area ($N_2SA$) of the filler to the iodine adsorption amount (IA) thereof (($N_2SA$)/(IA)) shows the surface activity of the filler. As this value is higher, interaction between the rubber and the filler is stronger. As described above, in the producing method according to the present invention, the wet rubber masterbatch is produced via the steps (I) to (III), and further the used filler is a filler strong in interaction with the rubber. Thus, the dispersibility of the filler in the masterbatch is especially excellent. As a result, also in the finally produced vulcanized rubber, the dispersibility of the filler is especially excellent so that the rubber is improved in fatigue resistance.

In the above-mentioned method for producing a wet rubber masterbatch, the nitrogen adsorption specific surface area ($N_2SA$) of the filler is preferably 100 $m^2/g$ or more. In the method for producing a wet rubber masterbatch, the difference of the DBF absorption amount (DBF) of the filler from the compressive DBP absorption amount (24M4DBP) of the filler (DBP-24M4DBP) is preferably 25 or less. It can be expected that these structural factors produce advantageous effects based on the use of the filler which is a small-particle-diameter filler, particularly, an improvement of the resultant rubber in strength and fatigue resistance.

In the method for producing a wet rubber masterbatch, at the time of regarding the entire amount of the rubber component in the wet rubber masterbatch as 100 parts by mass, the content of the filler is preferably less than 60 parts by mass. By controlling the content of the filler into a low value, the particles of the filler can be prevented from aggregating again, and the resultant vulcanized rubber can be improved in fatigue resistance.

DETAILED DESCRIPTION OF THE PREFERRED EMBODIMENTS

The present invention relates to a method for producing a wet rubber masterbatch yielded using at least a filler, a dispersing solvent, and a rubber latex solution as raw materials.

In the present invention, the filler denotes an inorganic filler used ordinarily in the rubber industry, such as carbon black, silica, clay, talc, calcium carbonate, magnesium carbonate, or aluminum oxide. In the invention, the use of carbon black, out of these inorganic fillers, is preferred.

It is preferred in the present invention to use a species of the carbon black in which the following ratio is 1.0 or more: the ratio of the nitrogen adsorption specific surface area ($N_2SA$) to the iodine adsorption amount (IA) (($N_2SA$)/(IA)). Examples of the carbon black species satisfying this requirement include N120 ($N_2SA$: 126 $m^2/g$; and IA: 122 mg/g), N121 ($N_2SA$: 122 $m^2/g$; and IA: 121 mg/g), N125 ($N_2SA$: 122 $m^2/g$; and IA: 117 mg/g), N134 ($N_2SA$: 143 $m^2/g$; and IA: 142 mg/g), N339 ($N_2SA$: 91 $m^2/g$; and IA: 90 mg/g), N343 ($N_2SA$: 96 $m^2/g$; and IA: 92 mg/g), N351 ($N_2SA$: 71 $m^2/g$; and IA: 68 mg/g), N375 ($N_2SA$: 93 $m^2/g$; and IA: 90 mg/g), N642 ($N_2SA$: 39 $m^2/g$; and IA: 36 mg/g), N650 ($N_2SA$: 36 $m^2/g$; and IA: 36 mg/g), M683 ($N_2SA$: 36 $m^2/g$; and IA: 35 mg/g), N754 ($N_2SA$: 25 $m^2/g$; and IA: 24 mg/g), N762 ($N_2SA$: 29 $m^2/g$; and IA: 27 mg/g), N765 ($N_2SA$: 34 $m^2/g$; and IA: 31 mg/g), N772 ($N_2SA$: 32 $m^2/g$; and IA: 30 mg/g), M774 ($N_2SA$: 30 $m^2/g$; and IA: 29 mg/g), and N787 ($N_2SA$: 32 $m^2/g$; and IA: 30 mg/g) each prescribed in ASTM D1765. The nitrogen adsorption specific surface area ($N_2SA$) and the iodine adsorption amount (IA) are each measurable on the basis of JIS K6217-1.

In the present invention, the nitrogen adsorption specific surface area ($N_2SA$) of the carbon black species is preferably 100 $m^2/g$ or more. Furthermore, the difference of the DBP absorption amount (DBP) of the carbon black species from the compressive DBP absorption amount (24M4DBP) of the carbon black species (DBP-24M4DBF)) is preferably 25 or less. The DBP absorption amount (DBP) and the compressive DBP absorption amount (24M4DGP) are each measurable on the basis of JIS K6217-4.

The used carbon black species may be a granulated species, which has been granulated, considering the handleability thereof in an ordinary rubber industry; or a non-granulated species.

When the entire amount of the rubber component (solid content) in the wet rubber masterbatch is regarded as 100 parts by mass, the content of the carbon black is preferably less than 60 parts by mass. The lower limit of the content of the carbon black may be, for example, 30 parts by mass.

The dispersing solvent is in particular preferably water, and may be, for example, water containing an organic solvent.

The rubber latex solution may be a natural rubber latex solution or a synthetic rubber latex solution.

The natural rubber latex solution is a natural product obtained by metabolic effect of a plant. Particularly preferred is a natural-rubber/aqueous latex solution in which a dispersing solvent is water. About the natural rubber latex solution, concentrated latex, fresh latex named field latex, and other latexes are usable without being distinguished from each other. The synthetic rubber latex solution is, for example, a latex solution of styrene-butadiene rubber, butadiene rubber, nitrile rubber or chloroprene rubber produced by emulsion polymerization.

The following will describe the method according to the present invention for producing a wet rubber masterbatch about an embodiment thereof, using carbon black. This producing method has: a step (I) of dispersing the carbon black into a dispersing solvent, and adding, at the time of the dispersing, at least one portion of a rubber latex solution to the dispersing solvent to produce a slurry solution containing the carbon black to which particles of the rubber latex adhere; a step (II) of mixing the slurry solution containing the carbon black, to which the rubber latex particles adhere, with the rest of the rubber latex solution to produce a rubber latex solution containing the carbon black, to which the rubber latex particles adhere; and a step (III) of solidifying and drying the rubber latex solution containing the carbon black.

In the step (I), the method for mixing the carbon black and the dispersing solvent with each other in the presence of the rubber latex solution is, for example, a method of dispersing the carbon black, using a dispersing machine such as a highly shearing mixer, a High Shear Mixer, or a homomixer.

The "highly shearing mixer" means a mixer having a high-speed-rotatable rotor and a fixed stator in which, in the state of making a precise clearance between the rotor and the stator, the rotor is rotated to produce a highly shearing effect. In order to produce such a highly shearing effect, it is preferred to set the clearance between the rotor and the stator to 0.8 mm or less, and set the circumferential speed of the rotor to 5 m/s or more. Such a highly shearing mixer may be a commercially available product. An example thereof is a mixer, "High Shear Mixer", manufactured by Silverson Machines, Inc.

(1) Step (I)

The step (I) is a step of dispersing carbon black into a dispersing solvent, and adding, at the time of the dispersing, at least one portion of a rubber latex solution to the dispersing solvent to produce a slurry solution containing the carbon black to which particles of the rubber latex adhere. It is allowable to mix the rubber latex solution beforehand with the dispersing solvent, and subsequently add the filler into the mixture to disperse the filler therein; or to add the carbon black to the dispersing solvent, and nest dispersing the carbon black in the dispersing solvent while adding the rubber latex solution into the mixture at a predetermined adding speed. Alternatively, it is allowable to add the carbon black into the dispersing solvent, and next add a predetermined divided volume of the rubber latex solution several times into the mixture while dispersing the carbon black in the dispersing solvent. By dispersing the carbon black into the dispersing solvent in the presence of the rubber latex solution, the slurry solution containing the carbon black can be produced, in which the rubber latex particles adhere to the carbon black. The addition amount of the rubber latex solution in the step (I) is, for example, from 0.075 to 12% by mass of the entire amount of the rubber latex solution to be used (the entire amount thereof to be added in the steps (I) and (II)).

In the step (I), the solid (rubber) content in the rubber latex solution to be added is preferably from 0.25 to 15%, more preferably from 0.5 to 6% by mass of the carbon black. The concentration of the solid (rubber) in the rubber latex solution to be added is preferably from 0.2 to 5% by mass, more preferably from 0.25 to 1.5% by mass. In these cases, a wet rubber masterbatch can be produced in which the dispersion degree of the carbon black is heightened while the rubber latex particles are surely caused to adhere to the carbon black.

In the present invention, at the time of mixing the carbon black with the dispersing solvent in the presence of the rubber latex solution, thereby producing the slurry solution containing the carbon black, to which the rubber latex particles adhere, a surfactant may be added into the solution in order to improve the carbon black in dispersibility. The surfactant may be a surfactant known in the rubber industry. Examples thereof include nonionic surfactants, anionic surfactants, cationic surfactants, and amphoteric surfactants. Instead of the surfactant or in addition of the surfactant, an alcohol such as ethanol may be used. However, when the surfactant is used, it is feared that the finally obtained vulcanized rubber is lowered in rubber physical properties. Thus, the blend amount of the surfactant is preferably 2 parts or less by mass, more preferably 1 part or less by mass for 100 parts by mass of the solid (rubber) content in the rubber latex solution. It is preferred not to use any surfactant substantially.

In the slurry solution produced in the step (I), the 90%-by-volume particle diameter ("D90") (μm) of the carbon black to which the rubber latex particles adhere is preferably 31 μm or more, more preferably 35 μm or more. In this case, the carbon black is excellent in dispersibility in the slurry solution, and further the carbon black can be prevented from aggregating again. Thus, the slurry solution is excellent in storage stability, and the finally obtained vulcanized rubber is also excellent in exothermic property, durability and rubber strength.

(2) Step (II)

The step (II) is a step of mixing the slurry solution with the rest of the rubber latex solution to produce a rubber latex solution containing the carbon black, to which the rubber latex particles adhere. The method for mixing the slurry solution with the rest of the rubber latex solution in a liquid phase is not particularly limited, and may be a method of attaining the mixing, using an ordinary dispersing machine such as a highly shearing mixer, a High Shear Mixer, a homo-mixer, a ball mill, a bead mill, a high-pressure homogenizer, an ultrasonic homogeniser or a colloid mill. As required, the whole of the dispersing machine or some other mixing system may be heated at the time of the mixing.

When the drying period and labor are considered in the step (III), it is preferred that the rest of the rubber latex solution is higher in solid (rubber) concentration than the rubber latex solution added in the step (I). Specifically, the solid (rubber) concentration is preferably from 10 to 60% by weight, more preferably from 20 to 30% by weight.

(3) Step (III)

The step (III) is a step of solidifying the rubber latex solution containing the carbon black. The method for the solidifying may be a method of adding a solidifier to the rubber latex solution containing the carbon black, to which the rubber latex particles adhere, to yield a solidified product.

The solidifier may be a substance used ordinarily to solidify a rubber latex solution, for example, an acid such as formic acid or sulfuric acid, or a salt such as sodium chloride.

In the step (III), the solidified product yielded at the solidifying stage is separated from the solution (solid-liquid separation), and the product is dried to produce a wet rubber masterbatch. At the stage of the solid-liquid separation, it is allowable as the need arises to incorporate a flocculant into the rubber latex solution containing the carbon black, and then collect and dry the resultant flocculated product. As the flocculant, any flocculant that is known as a flocculant for a rubber latex solution is usable without any restriction. A specific example thereof is a cationic flocculant. Moreover, for the solid-liquid separation, a method known by those skilled in the art may be performed, this method being, for example, centrifugal separation or filtration.

The method for drying the flocculated product may be a method using a drying machine that may be of various types, such as an oven, a vacuum drier, or an air drier.

After the step (III) is performed, the resultant wet rubber masterbatch is dry-mixed with various blending agents. The blending agents that can be used may be blending agents used ordinarily in the rubber industry, examples of the agents including a sulfur-containing vulcanizer, a vulcanization promoter, silica, a silane coupling agent, zinc oxide, a methylene receptor and a methylene donor, stearic acid, a vulcanization promotion aid, a vulcanization retarder, an organic peroxide, an antiaging agent, softeners such as wax and oil, and a working aid.

The species of sulfur in the sulfur-containing vulcanizer may be of any ordinary sulfur species for rubbers. Examples thereof include powdery sulfur, precipitated sulfur, insoluble sulfur, and highly dispersible sulfur. The sulfur content in the rubber composition according to the present invention is preferably from 0.3 to 6 parts by mass for 100 parts by mass of the rubber component. If the sulfur content is less than 0.3 part by mass, the vulcanized rubber is short in crosslinkage density to be lowered in rubber strength and others. If the content is more than 6.5 parts by mass, the vulcanized rubber is deteriorated, particularly, in both of heat resistance and durability. In order to keep the rubber strength of the vulcanized rubber good certainly and improve the heat resistance and the durability further, the sulfur content is more preferably set into the range of 1.5 to 5.5 parts by mass for 100 parts by mass of the rubber component.

The vulcanization promoter may be a vulcanization promoter usable ordinarily for vulcanizing rubbers. Examples thereof include sulfenamide type, thiuram type, thiazole type, thiourea type, guanidine type, and dithiocarbamic acid salt type vulcanization promoters. These may be used singly or in the form of an appropriate mixture. The vulcanization promoter content is preferably from 1.0 to 5.0 parts by mass for 100 parts by mass of the rubber component.

The antiaging agent may be an antiaging agent usable ordinarily for rubbers, examples thereof including aromatic amine type, amine-ketone type, monophenolic type, bisphenolic type, polyphenolic type, dithiocarbamic acid salt type, and thiourea type antiaging agents. These may be used singly or in the form of an appropriate mixture. The antiaging agent content is preferably from 0.5 to 6.0 parts by mass for 100 parts by mass of the rubber component.

As described above, the wet rubber masterbatch yielded in the step (III) is excellent in carbon-black-dispersing performance. Thus, a pneumatic tire produced using this rubber composition has a rubber moiety excellent in fatigue resistance, a specific example of this tire including a pneumatic tire making use of the rubber composition according to the present invention in its tread rubber, side rubber, ply or belt coating rubber, or bead filler rubber.

EXAMPLES

Hereinafter, this invention will be more specifically described by way of working examples of the invention.
(Used Materials)
a) Fillers
    Carbon black A: "NITERON #3001H" (manufactured by NSCC Carbon Co., Ltd.)
    Carbon black B: "SEAST 7HM" (manufactured by Tokai Carbon Co., Ltd.)

Carbon black C: "VULCAN 7H" (manufactured by Cabot Corp.)

In Table 1 are shown the following values of the carbon blacks A to C: $N_2SA$, IA, $N_2SA/IA$, DBP, 24M4DBP, and "DBP-244DBP"

TABLE 1

|  | Carbon black A | Carbon black B | Carbon black C |
|---|---|---|---|
| DBP (cm³/100 g) | 127 | 126 | 123 |
| 24M4DBP (cm³/100 g) | 105 | 100 | 100 |
| IA (mg/g) | 124 | 120 | 118 |
| $N_2SA$ (m²/g) | 120 | 126 | 123 |
| ($N_2SA$)/(IA) | 0.968 | 1.05 | 1.042 |
| (DBP) − (24M4DBP) | 22 | 26 | 23 | b) Dispersing solvent: water;
c) Rubber latex solution: natural rubber latex solution (NR field latex) (manufactured by Golden Hope Plantations Berhad) (latex solution having a DRC of 31.2% that was adjusted to have a rubber concentration of 25% by mass; mass-average molecular weight Mw=232000);
d) Solidifier: formic acid (first class 85%, a 10% solution thereof was diluted to be adjusted into a pH of 1.2) (manufactured by Nacalai Tesque, Inc.);
e) Zinc flower: zinc flower No. 1 (manufactured by Mitsui Mining & Smelting Co., Ltd.);
f) Stearic acid: "LUNACK S-20" (manufactured by Kao Corp.);
g) Wax: "OZOACE 0355" (manufactured by Nippon Seiro Co., Ltd.);
h) Antiaging agent:
N-phenyl-N'-(1,3-dimethylbutyl)-p-phenylenediamine "6PPD" (manufactured by Monsanto company);
i) Sulfur: "powdery sulfur" (manufactured by Tsurumi Chemical Industry Co., Ltd.);
j) Vulcanization promoter: "CBS" (manufactured by Sanshin Chemical Industry Co., Ltd.); and
k) Natural rubber: RSS #3.

Examples 1 and 2, Comparative Example 3

In each of these examples, one of the carbon blacks was added into a natural rubber diluted latex solution in water that had a concentration adjusted into 0.52% by mass, so as to have a blend amount in Table 2 (the carbon black concentration in water was 5% by mass). A machine ROBOMIX manufactured by Primix Corp. was used (ROBOMIX conditions: a rotation number of 9000 rpm, and a use period of 30 minutes) to disperse the carbon black into the solution to produce a slurry solution containing the carbon black, shown in Table 1, in which natural rubber latex particles adhered to the carbon black (step (I)). Next, a 28%-by-mass solution of natural rubber latex was added to the slurry solution produced in the step (I), containing the carbon black, to which the natural rubber latex particles adhered, to have a blend amount shown in Table 2. Next, a mixer for household use, SM-L56 model, manufactured by Sanyo Electric Co. Ltd. was used (mixer conditions: a rotation number of 11300 rpm, and a use period of 30 minutes) to mix the latex solution and the slurry solution with each other to produce a rubber latex solution containing the carbon black, to which the natural rubber latex particles adhered (step (II)).

Formic acid as a solidifier was added to the natural rubber latex solution produced in the step (II) and containing the carbon black, to which the natural rubber latex particles adhered, to change the pH of the whole of the solution to 4. In this way, a carbon-black-containing natural rubber solidified product was yielded. The resultant carbon-black-containing natural rubber solidified product was charged into a screw press, V-01 model, manufactured by Suehiro EPM Corp. to be dehydrated. In this way, a wet rubber masterbatch was produced (step (III)).

A Bunbury mixer was used to dry-mix each of the wet rubber masterbatches yielded as described above with various blending agents described in a column in Table 2 to produce a rubber composition. In Table 2, each of the blended amounts is shown as relative parts by mass (phr) when the entire amount of the rubber component was regarded as 100 parts by mass.

Comparative Example 1

A Bunbury mixer was used to dry-mix natural rubber, one of the carbon blacks, and various blending agents described in a column in Table 2 with each other to produce a rubber composition.

Comparative Example 2

The entire amount of the natural rubber latex solution, one of the carbon blacks and water were mixed in accordance with blend amounts described in a column in Table 2 to produce a wet rubber masterbatch. A Bunbury mixer was used to dry-mix this masterbatch with various blending agents described in a column in Table 2 to produce a rubber composition.

(Evaluation)

A predetermined mold was used to heat and vulcanize each of the resultant rubber compositions at 150° C. for 30 minutes to evaluate the composition as described below.

(Fatigue Resistance)

In accordance with JIS K6260, the fatigue resistance of each of the produced vulcanized rubbers was evaluated, using an index value relative to the value of Comparative Example 1, which was regarded as 100. As the examples have a larger numerical value, the examples are better in fatigue resistance. The results are shown in Table 2.

TABLE 2

|  |  |  | Comparative Example 1 | Comparative Example 2 | Comparative Example 3 | Example 1 | Example 2 |
|---|---|---|---|---|---|---|---|
| Wet rubber masterbatch production | Natural rubber (solid) | Parts by mass (phr) | — | 100 | 100 | 100 | 100 |
|  | Carbon black A | Parts by mass (phr) | — | 50 | 50 | — | — |
|  | Carbon black B | Parts by mass (phr) | — | — | — | 50 | — |
|  | Carbon black C | Parts by mass (phr) | — | — | — | — | 50 |
|  | Charging of latex at the time of slurry-production | Parts by mass (phr) | — | Not done | Done | Done | Done |

TABLE 2-continued

| | | | Comparative Example 1 | Comparative Example 2 | Comparative Example 3 | Example 1 | Example 2 |
|---|---|---|---|---|---|---|---|
| Rubber composition production | Natural rubber | Parts by mass (phr) | 100 | — | — | — | — |
| | Carbon black A | Parts by mass (phr) | 50 | — | — | — | — |
| | Zinc flower | Parts by mass (phr) | 3 | 3 | 3 | 3 | 3 |
| | Stearic acid | Parts by mass (phr) | 2 | 2 | 2 | 2 | 2 |
| | Wax | Parts by mass (phr) | 2 | 2 | 2 | 2 | 2 |
| | Antiaging agent | Parts by mass (phr) | 2 | 2 | 2 | 2 | 2 |
| | Sulfur | Parts by mass (phr) | 2 | 2 | 2 | 2 | 2 |
| | Vulcanization promoter | Parts by mass (phr) | 1.5 | 1.5 | 1.5 | 1.5 | 1.5 |
| Fatigue resistance of vulcanized rubber | | | 100 | 105 | 114 | 124 | 133 |

What is claimed is:

1. A method for producing a wet rubber masterbatch containing at least a filler, a dispersing solvent and a rubber latex solution as raw materials, the method comprising :
    a step (I) of dispersing the filler into the dispersing solvent , and adding, at the time of the dispersing, at least one portion of the rubber latex solution to the dispersing solvent to produce a slurry solution containing the filler to which particles of the rubber latex adhere;
    a step (II) of mixing the slurry solution containing the filler, to which the rubber latex particles adhere, with the rest of the rubber latex solution to produce a rubber latex solution containing the filler, to which the rubber latex particles adhere; and
    a step (III) of solidifying and drying the rubber latex solution containing the filler,
    wherein the filler has a ratio of the nitrogen adsorption specific surface area ($N_2SA$) thereof to the iodine adsorption amount (IA) thereof (($N_2SA$)/(IA)) of 1.00 or more, and
    wherein the nitrogen adsorption specific surface area ($N_2SA$) of the filler is 100 $m^2/g$ or more.

2. The method for producing a wet rubber masterbatch according to claim 1, wherein the difference of the DBP absorption amount (DBP) of the filler from the compressive DBP absorption amount (24M4DBP) of the filler (DBP-24M4DBP) is 25 or less.

3. The method for producing a wet rubber masterbatch according to claim 1, wherein when the entire amount of the rubber component in the wet rubber masterbatch is regarded as 100 parts by mass, the content of the filler in the masterbatch is less than 60 parts by mass.

* * * * *